United States Patent [19]

Haupt et al.

[11] 4,303,334

[45] Dec. 1, 1981

[54] HEAT REGULATOR FOR THE FUSING DEVICE IN AN ELECTROSTATIC COPIER

[75] Inventors: George J. Haupt; Gerald E. Carlson, both of Webster; Eugene S. Evanitsky, Pittsford, all of N.Y.

[73] Assignee: Xerox Corporation, Stamford, Conn.

[21] Appl. No.: 80,958

[22] Filed: Oct. 1, 1979

[51] Int. Cl.[3] .................... G03B 27/00; G03G 15/00

[52] U.S. Cl. .................................... 355/133; 165/1; 165/12; 355/14 FU; 355/30; 432/4; 432/60

[58] Field of Search ............... 355/3 R, 3 FU, 14 FU, 355/30, 14 R, 133; 432/4, 60, 228; 165/1, 12

[56] References Cited

U.S. PATENT DOCUMENTS 3,330,189 7/1967 Vil .......................... 355/14 FU X 3,628,860 12/1971 Ogawa .............................. 355/10

3,816,066 6/1974 Thettu et al. .................. 355/30 X 4,082,137 4/1978 Mueller ...................... 355/3 FU X

*Primary Examiner*—Fred L. Braun

*Attorney, Agent, or Firm*—Ronald F. Chapuran

[57] ABSTRACT

A heat regulator for a fuser in a reproduction machine. The heat regulator includes a fuser cooling fan, and a controller having a cooling fan counter. The cooling fan counter manifests the number of copies reproduced up to a predetermined maximum in response to a document scan switch. The contents of the cooling fan counter is the basis for determining the length of time of operation of the cooling fan at the end of a reproduction run. Specifically, the machine cooling fan maintains operation during machine cycle out at the end of a reproduction run for a three second period for each count in the cooling fan counter up to a predetermined maximum.

9 Claims, 9 Drawing Figures

HEAT REGULATOR FOR THE FUSING DEVICE IN AN ELECTROSTATIC COPIER

This invention relates to reproduction machines and particularly to a method of cooling the reproduction machine.

The relatively high temperatures generated by elements in a reproduction machine, for example, the fuser, can have an undesirable effect on the other components of the reproduction machine if not adequately controlled. For example, photosensitive materials are often easily damaged by heat. The photosensitive materials in some prior art reproduction machines have been insulated from the fusing device by providing suitable air currents from a blower. In these arrangements, however, it is difficult to control the direction and strength of air flow. In addition, if the flow of cooling air is substantial, the efficiency of the fusing device decreases and the heat emanating from the fuser tends to be drawn in the direction of the photosensitive material.

Other systems such as disclosed in U.S. Pat. No. 3,901,591 provide cooling by blowing air from outside the machine onto the surface of the photosensitive material and ventilating heat generated by the fuser away from the photosensitive materials and discharging the heat outside of the machine. One difficulty with this type of system is the requirement of multiple fan devices adding complexity and cost to the system.

It is often difficult to provide a cooling system that has suitable capacity and heat transfer rate to be able to prevent overheat during extended runs and yet not cool the system substantially below suitable standby temperature levels for less extended runs.

It would be desirable, therefore, to provide a cooling system that can be tailored or adapted to meet customer machine useage, that is, accomodate various copy run lengths and time periods between runs to provide cooling with maximum efficiency. It would also be desirable to eliminate thermal spike temperatures on machine shutdown and reduce nuisance tripping of over temperature thermostats as well as to minimize instances of over cooling.

Accordingly, it is an object of the present invention to provide an improved heat regulating or cooling system in a reproduction machine, in particular a system adapted to customer machine usage. Further advantages of the present invention will become apparent as the following description proceeds and the features characterizing the invention will be pointed out in the claims annexed to and forming a part of this specification.

Briefly, the present invention is concerned with a fuser, a fuser cooling fan, and a controller having a cooling fan counter. The cooling fan counter manifests the number of copies reproduced up to a predetermined maximum in response to a document scan switch and the contents of the cooling fan counter is the basis for determining the length of time of operation of the cooling fan at the end of a reproduction run. Specifically, the machine cooling fan maintains operation during machine cycle out at the end of a reproduction run for a three second period for each count in the cooling fan counter up to a predetermined maximum.

BRIEF DESCRIPTION OF THE DRAWINGS

For a better understanding of the present invention, reference may be had to the accompanying drawings, wherein the same reference numerals have been applied to like parts and wherein.

DESCRIPTION OF THE INVENTION

Figure 1:
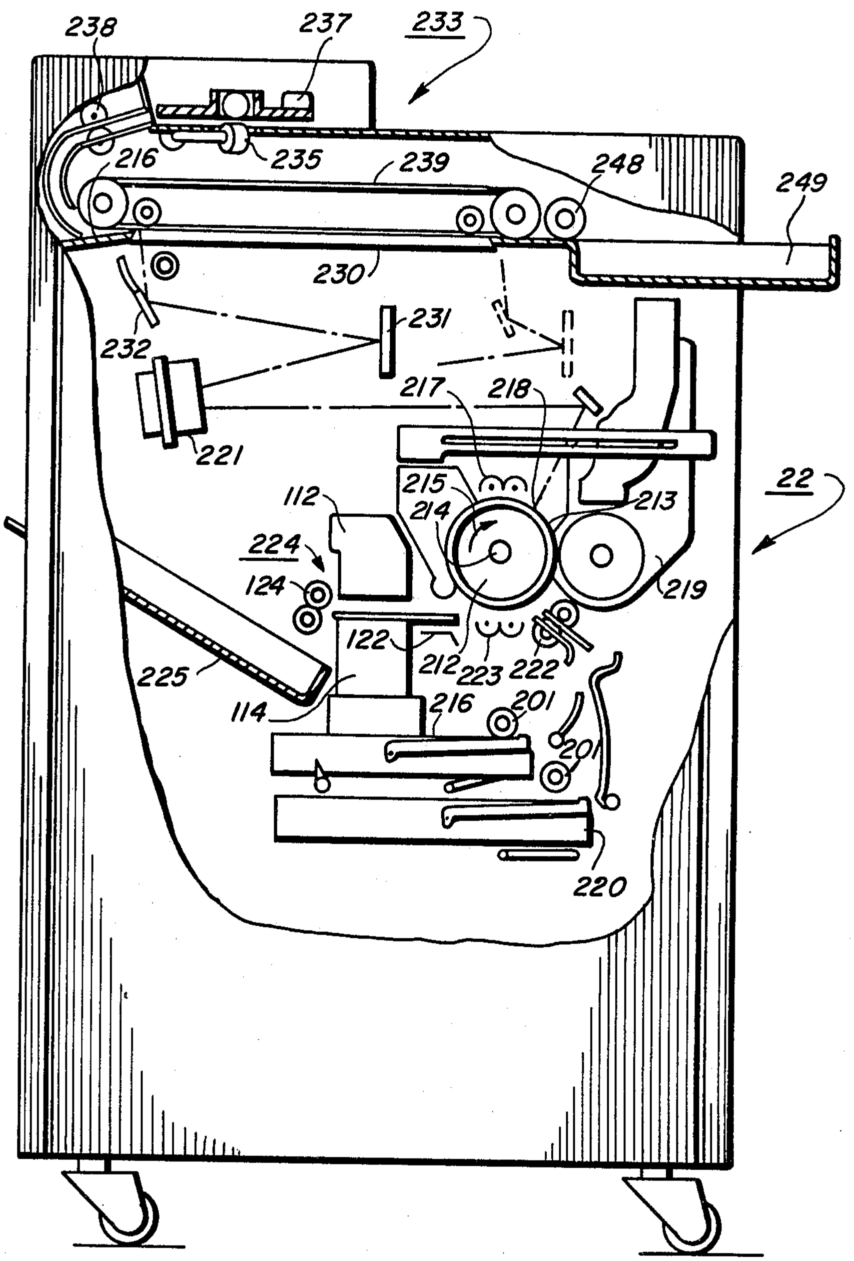
FIG. 1 is a representation of a reproducing apparatus incorporating the present invention.
Figure 2:
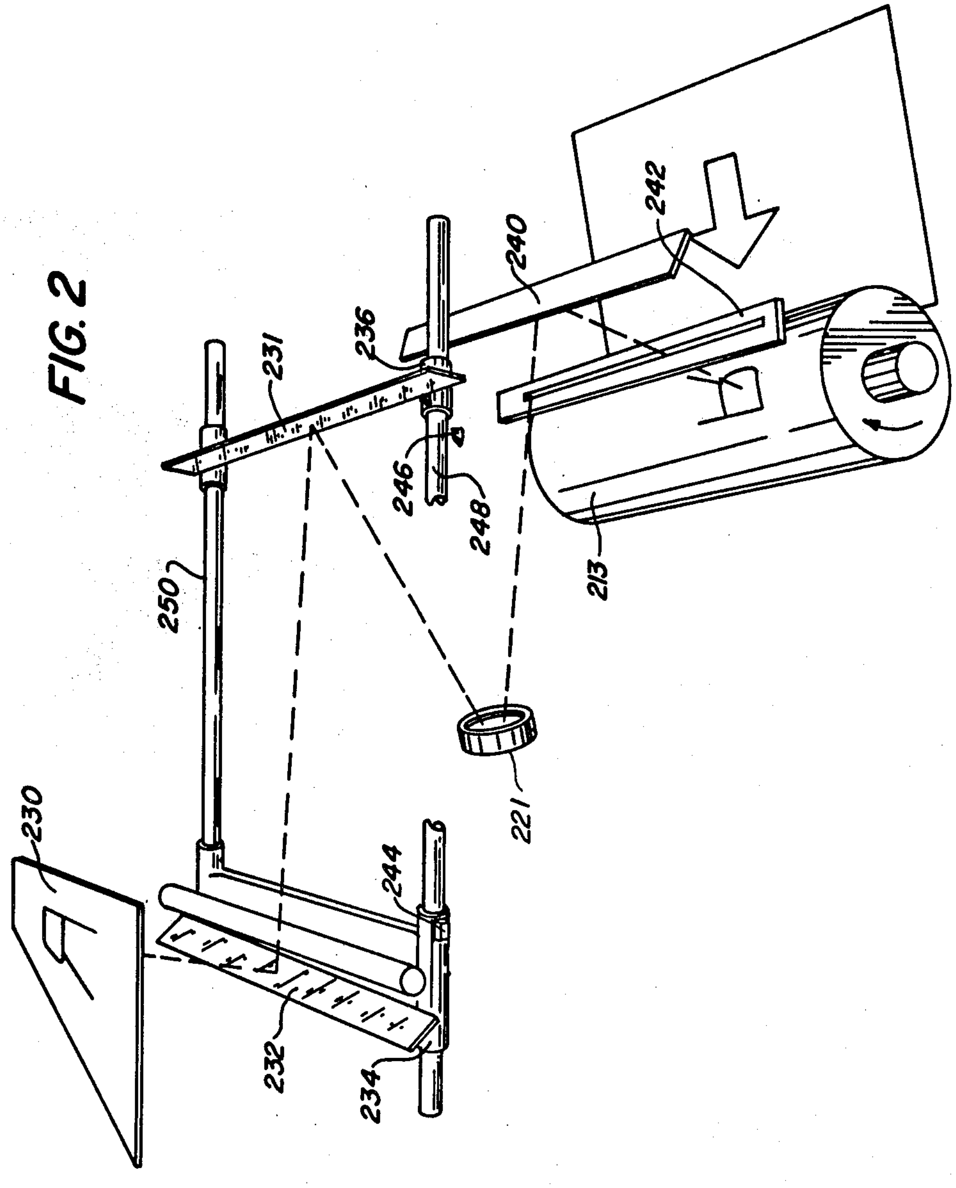
FIG. 2 is a more detailed representation of the scanning and optics system of the apparatus of FIG. 1.

Referring now to FIGS. 1 and 2 there is shown by way of example an automatic xerographic reproducing machine 22 including an image recording drumlike member 212, its outer periphery coated with suitable photoconductive material or surface 213. The drum 212 is suitably journaled for rotation within a machine frame (not shown) by means of shaft 214 and rotates in the direction indicated by arrow 215 to bring the image-bearing surface 213 thereon past a plurality of xerographic processing stations. Suitable drive means (not shown) are provided to power and coordinate the motion of the various cooperating machine components whereby a faithful reproduction of the original input scene information is recorded upon a sheet of final support material or copy sheet 216.

Initially, the drum 212 moves the photoconductive surface 213 through a charging station 217 providing an electrostatic charge uniformly over the photoconductive surface 213 in known manner preparatory to imaging. Thereafter, the drum 212 is rotated to exposure station 218 and the charged photoconductive surface 213 is exposed to a light image of the original document to be reproduced. The charge is selectively dissipated in the light exposed regions to record the original document in the form of an electrostatic latent image. After exposure drum 212 rotates the electrostatic latent image recorded on the photoconductive surface 213 to development station 219 wherein a conventional developer mix is applied to the photoconductive surface 213 of the drum 212 rendering the latent image visible. Typically a suitable development station could include a magnetic brush development system utilizing a magnetizable developer mix having coarse ferromagnetic carrier granules and toner colorant particles.

Sheets 216 of the final support material are supported in a stack arrangement on an elevating stack support tray 220. With the stack at its elevated position a sheet separator 221 feeds individual sheets therefrom to the registration system 222. The sheet is then forwarded to the transfer station 223 in proper registration with the image on the drum. The developed image on the photoconductive surface 213 is brought into contact with the sheet 216 of final support material within the transfer station 223 and the toner image is transferred from the photoconductive surface 213 to the contacting side of the final support sheet 216. Following transfer of the image the final support material is transported through a detack station where a detack corotron uniformly charges the support material to separate it from the drum 212.

After the toner image has been transferred to the sheet of final support material or copy sheet 216, the copy sheet 216 with the image is advanced to a suitable fusing station 224 for coalescing the transferred powder image to the support material. After the fusing process, the copy sheet 216 is advanced to a suitable output device such as tray 225.

Although a preponderance of toner powder is transferred to the copy sheet 216, invariably some residual toner remains on the photoconductive surface 213. The residual toner particles remaining on the photoconductive surface 213 after the transfer operation are removed from the drum 212 as it moves through a cleaning station. The toner particles may be mechanically cleaned from the photoconductive surface 213 by any conventional means, as for example, by the use of a cleaning blade.

Normally, when the copier is operated in a conventional mode, the original document to be reproduced is placed image side down upon a horizontal transparent platen 230 and the stationary original then scanned by means of a moving optical system. The scanning system includes a stationary lens 221 and a pair of cooperating movable scanning mirrors, half rate mirror 231 and full rate mirror 232 supported upon carriages not illustrated.

A document handler 233 is also provided including registration assist roll 235 and switch 237. When a document is inserted, switch 237 activates registration assist roll 235 and the document is fed forward and aligned against a rear edge guide of the document handler 233. The pinch rolls 238 are activated to feed a document around 180° curved guides onto the platen 230 for copying. The document is driven by a platen belt transport including platen belt 239. After copying, the platen belt 239 is activated and the document is driven off the platen by the output pinch roll 248 into the document catch tray 249.

Once the document is in position for copying, the scanning optical system is activated and the document is scanned by full rate mirror 232 and half rate mirror 231. At the end of scan, the full rate mirror 232 and the half rate mirror 231 are in the positions shown in phantom in FIG. 1. The full rate mirror 232 supported on a full rate carriage 234 as seen in FIG. 2, reflects the document image from the platen 230 to the half rate mirror 231. The half rate mirror 231 supported on a half rate carriage 236 reflects the image from the full rate mirror 232 to the lens 221 and the image is then projected to the image mirror 240 to reflect a focused image from the lens 221 onto the drum surface 213 through aperture plate 242. A (not shown) scan drive clutch transmits mechanical power from a main drive motor through suitable drive shaft and pulleys to the full rate and half rate carriages to drive the carriages along rails 248, 250.

A scan switch illustrated at 244 is located on the full rate carriage 234 and provides a signal to activate the scan drive clutch. If the scan switch is not actuated at the proper time, a jam or abnormal condition will be sensed. In operation, the activation of the scan drive clutch causes the carriages to move from left to right from a scan home position to a scan end position. Once the carriage has reached the scan end position, the scan switch 244 will be actuated by an end of scan ramp 246 on rail 248 causing the drive clutch to de-energize, allowing the carriage to return to the scan home position. The activation of the scan switch 244 by the end of scan ramp provides a signal to the microprocessor 12 to activate a fan counter 130, an 8 bit register internal to the microprocessor 12, as illustrated in FIG. 3.

In accordance with the present invention, at the end of a copy run or at cycle out, a fan cooling period is provided generally dependent upon the number of copies or reproductions produced. There is a three second cooling period for each copy produced up to a maximum of 180 seconds or 60 copies. Since the cooling fan remain on during the fusing operation, the cycle out procedure provides an additional interval of time for the cooling fan to remain on.

Figure 3:
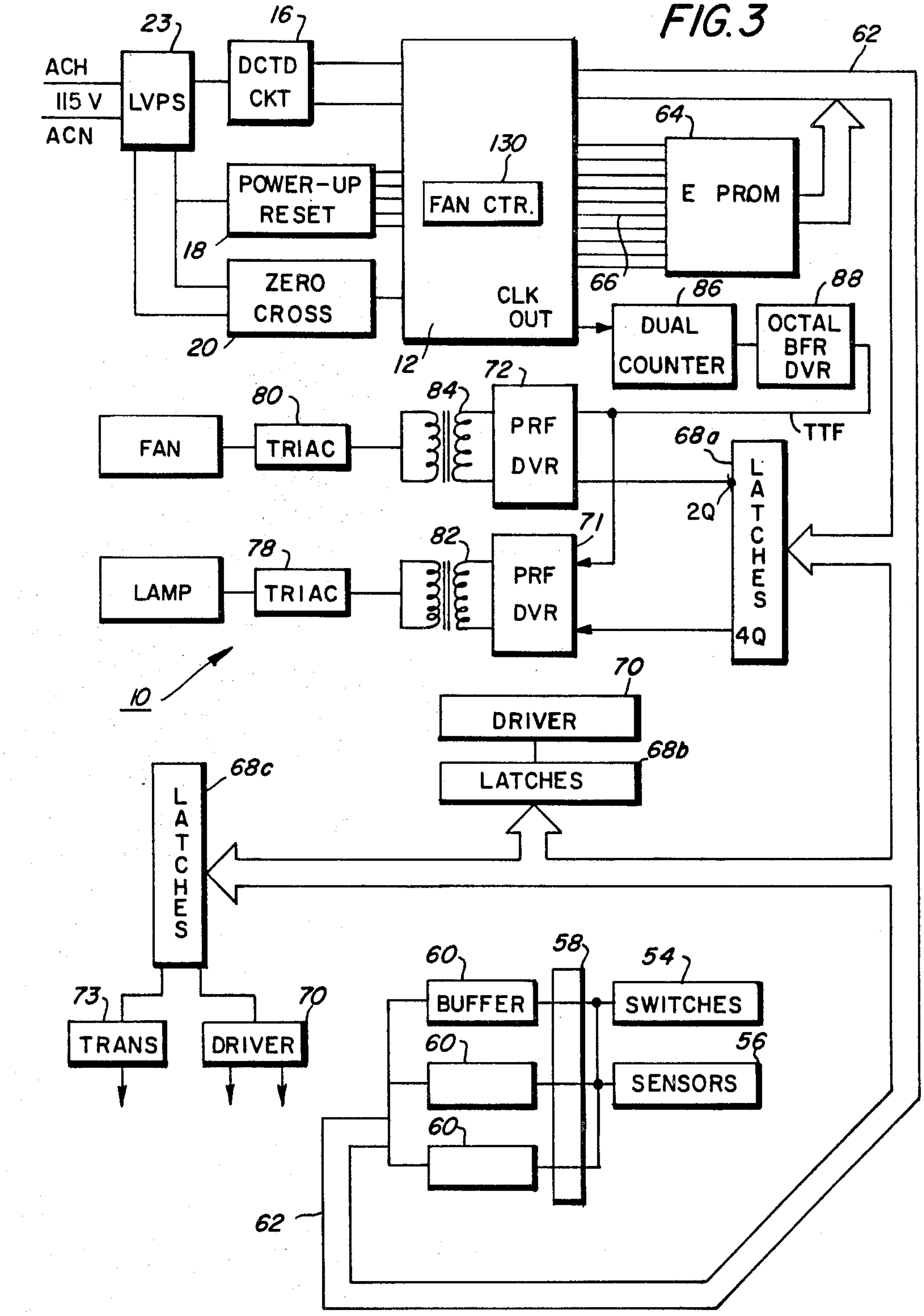
FIG. 3 is a block diagram of the controller in accordance with the present invention.

With reference to FIG. 3, there is shown a controller generally indicated at 10 including a bidirectional bus 62, microprocessor 12, dedicated circuitry 16, power up reset circuitry 18, and zero crossover circuitry 20 for controlling a reproduction machine including a low voltage power supply 23 connected to an input line voltage source preferably 115 volts alternating current. Preferably, the microprocessor 12 includes a 2K by 8 read only memory ROM, an address stack, a 64 by 8 random access memory RAM, an 8 bit arithmetic logic unit ALU, a control, a clock counter, a programmable timer, an interrupt control, an 8 bit input-output port, and an analog to digital converter ADC interconnected to a common internal bus. The bidirectional bus 62 interconnects the microprocessor 12 and host machine 22 and generally conveys signals from sensors 56 and switches 54 of the machine 22 to microprocessor 12 and conveys control signals from microprocessor 12 to the machine 22 via suitable drivers. For a more detailed discussion of microprocessor 12, reference is made to U.S. Ser. No. 000,624, filed Oct. 1, 1979, now U.S. Pat. No. 4,246,592, incorporated herein.

With reference to FIGS. 3, **4*a*, 4*b* and 4*c*, the signals of various reproduction machine switches 54 and sensors 56 are conveyed through a resistance network 58 and suitable buffers 60 to an 8 bit external data bus 62 connected to microprocessor 12. Typically, the resistance work 58 is any standard dual inline package configuration of thick film elements baked onto a ceramic substrate, terminated with wire leads and providing resistance in the range of 22 ohms to 220 Kohms. Buffers 60 are preferably octal buffers and line drivers with three state outputs. The 8 bit data bus 62 is also connected to a suitable memory device such as EPROM 64 interconnected to microprocessor 12 through suitable address lines 66. It should be noted that the EPROM device 64 can be replaced by a suitable read only memory internal to the microprocessor 12**.

Outputs to the reproduction machine controlled elements are conveyed from the microprocessor 12 along the external data bus 62 to various latches **68*a*, 68*b* and 68*c*. The latches are preferably Schotky TTL octal d-type flip-flops and are interconnected to various drivers 70, 71 and 72, or transistors 73 to activate various clutches, solenoids, motor drives, triacs and power supplies in machine 22. Typical drivers 70 are high voltage, high current Darlington transistor arrays with high breakdown voltage and internal suppression diodes. Preferably, drivers 71 and 72 are peripheral NAND gates. In particular, the reproduction machine 22 includes fuser heat lamp 74 and fuser cooling fan 76 activated by triacs 78 and 80 through transformers 82 and 84**, respectively.

With further reference to FIGS. 3, **4*a*, 4*b* and 4*c*, there is pulse train generation circuitry connected to the microprocessor 12** including a dual 4 bit binary counter 86 receiving clock out signals from the microprocessor 12 and an octal buffer driver 88. The counter 86 counts down the clock out signal producing a suitable periodic signal conveyed to the octal buffer and driver 88. The output of the driver 88 provides a pulse train TTF to peripheral driver 72 and the other input to the peripheral driver 72 is the output of pin 2Q of latch 68*a*. The output of pin 2Q going high, enables driver 72 and the output of the driver 72 activates triac 80 through transformer 84. In effect, the combination of the pulse the train TTF and the output from pin 2Q of the octal latch 68*a* in response to data from the microprocessor 12 over the data bus 62, generates an output from the driver 72 activating triac 80. The driver 72 activating triac 80 determines the duty cycle or degree of activation of the cooling fan 76.

The output of the driver 88 also provides a pulse train TTF to peripheral driver 71 and the other input to the peripheral driver 71 is the output of pin 4Q of latch 68*a*. The output of pin 4Q going high, enables driver 71 and the output of the driver 71 activates triac 78 through transformer 82. In effect, the combination of the pulse train TTF and the output from pin 4Q of the octal latch 68*a* in response to data from the microprocessor 12 over the data bus 62, generates an output from the driver 71 activating triac 78. The driver 71 activating triac 78 determines the duty cycle or degree of activation of the fuser heat lamp 74.

Figure 5:
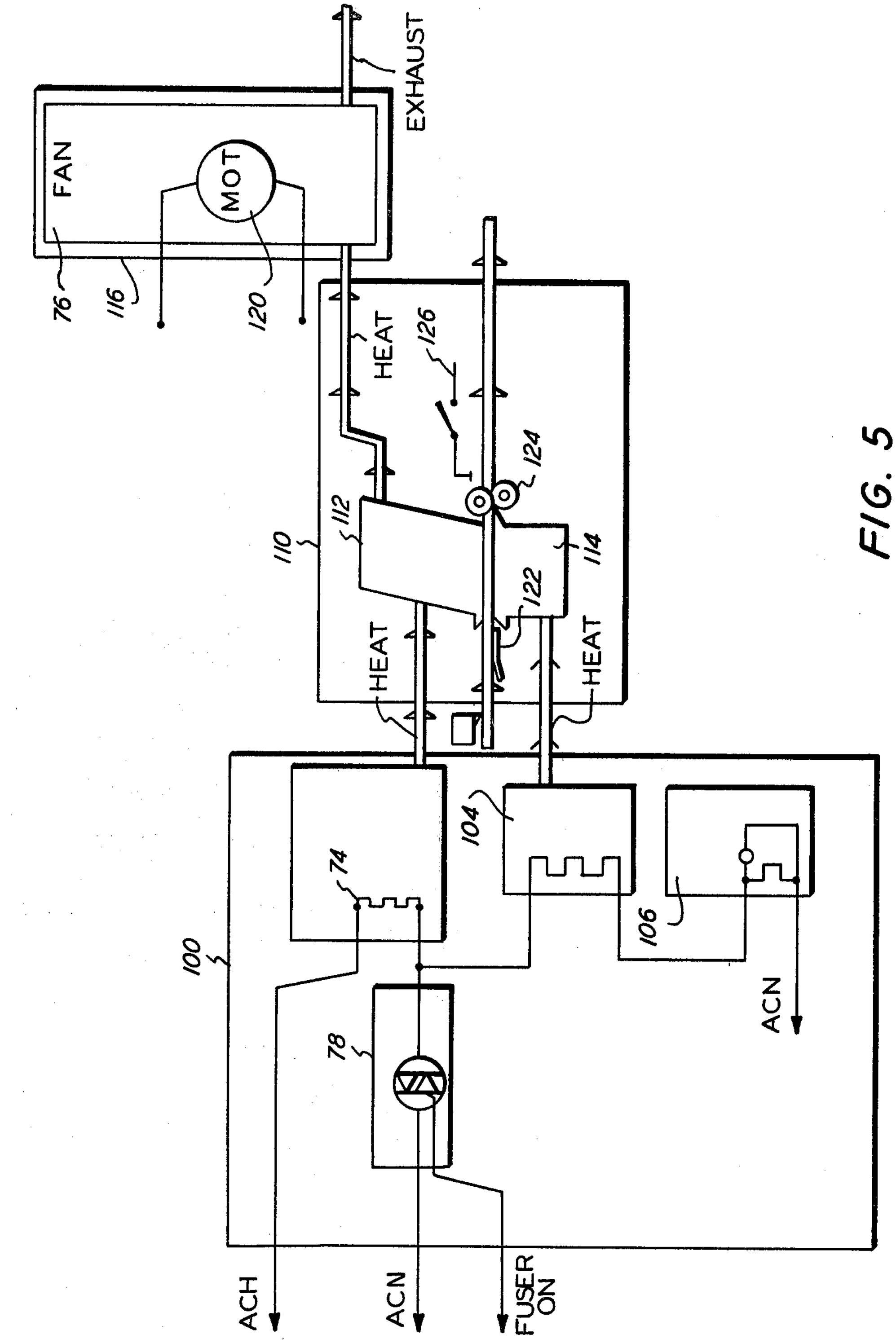
FIG. 5 is an illustration of the fuser station including cooling fan.

For a clearer understanding of the control of the fuser station 224, the fuser station is shown schematically in FIG. 5 as three components, the fuser heat control component 100 including fuser triac 78, fuser heat lamp 74, base heater 104, and base heater thermostat 106, the copy fusing and transportation component 110 including upper fuser 112, lower fuser or base 114 and the air supplying component 116 including cooling fan 76 and motor 120. It should be understood, however, that fuser heat lamp 74 and base heater 104 are an integral part of the upper fuser 112 and base 114, respectively and are shown separately for a clearer description.

Figure 4A:
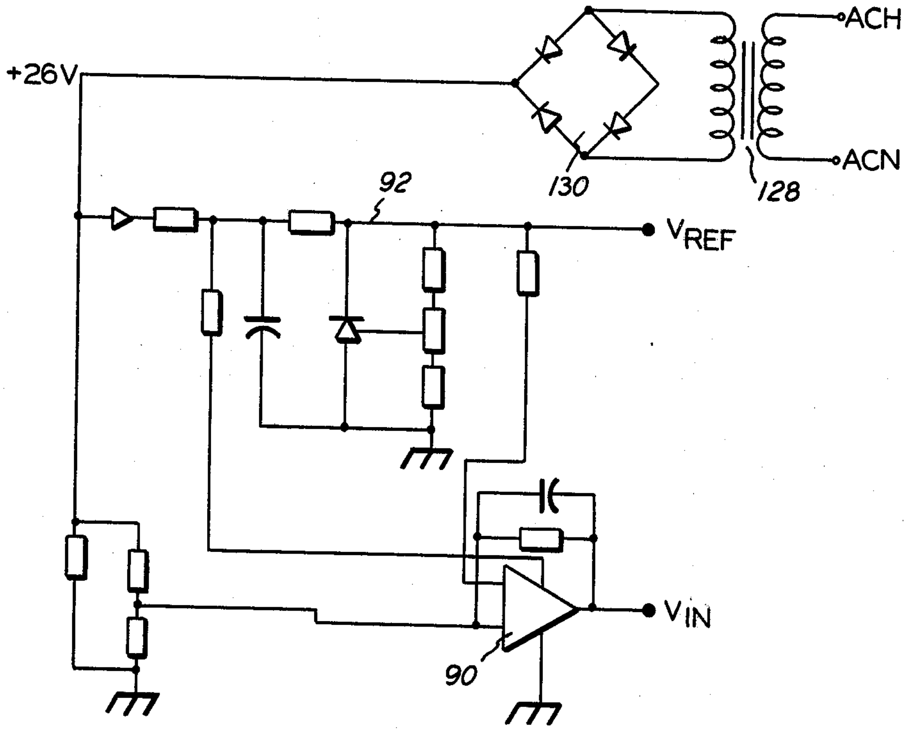
FIGS. 4*a*, 4*b* and 4*c* are schematic diagrams of details of the controller shown in FIG. 3.
Figure 4B:
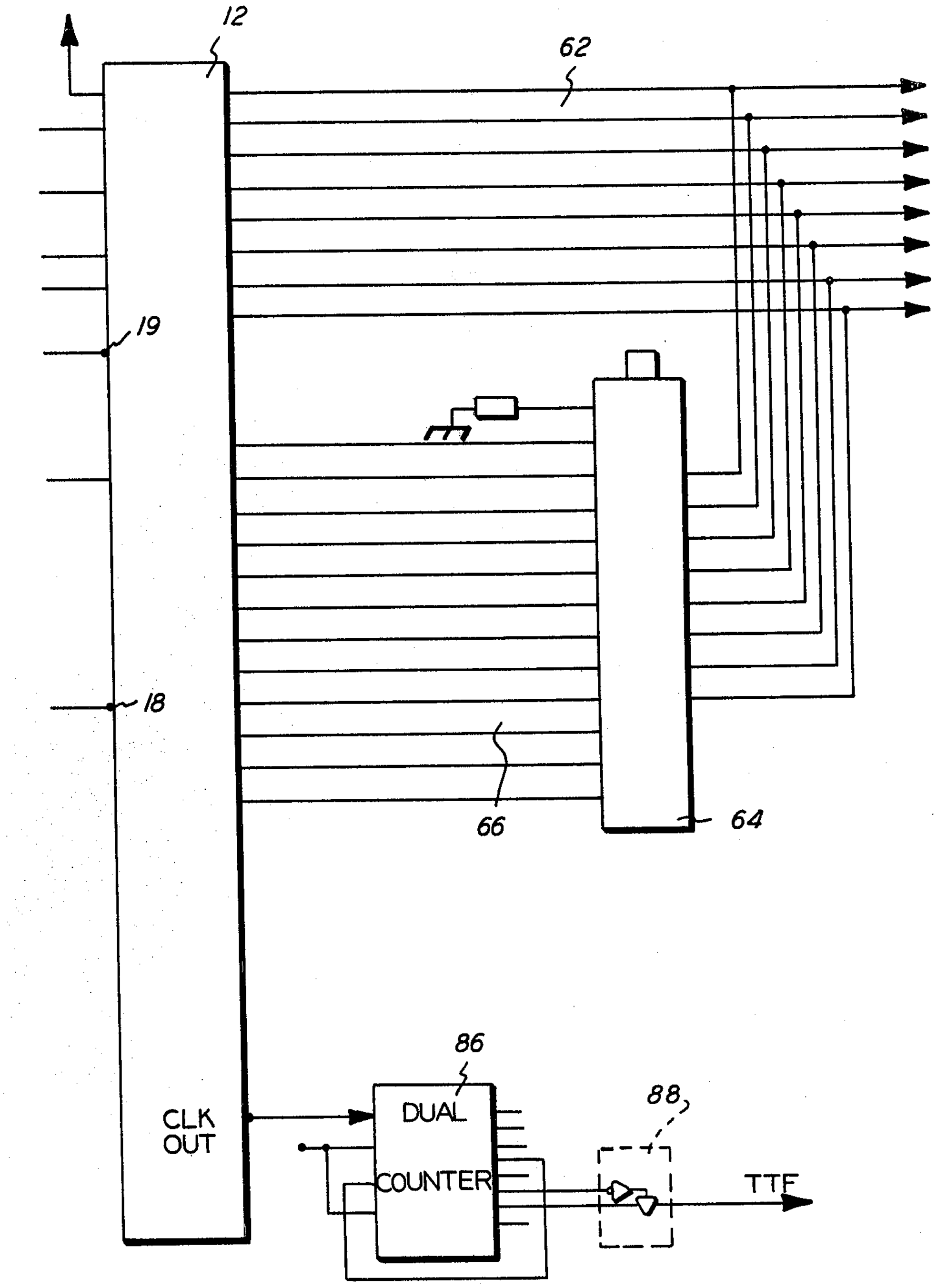
Figure 4C:
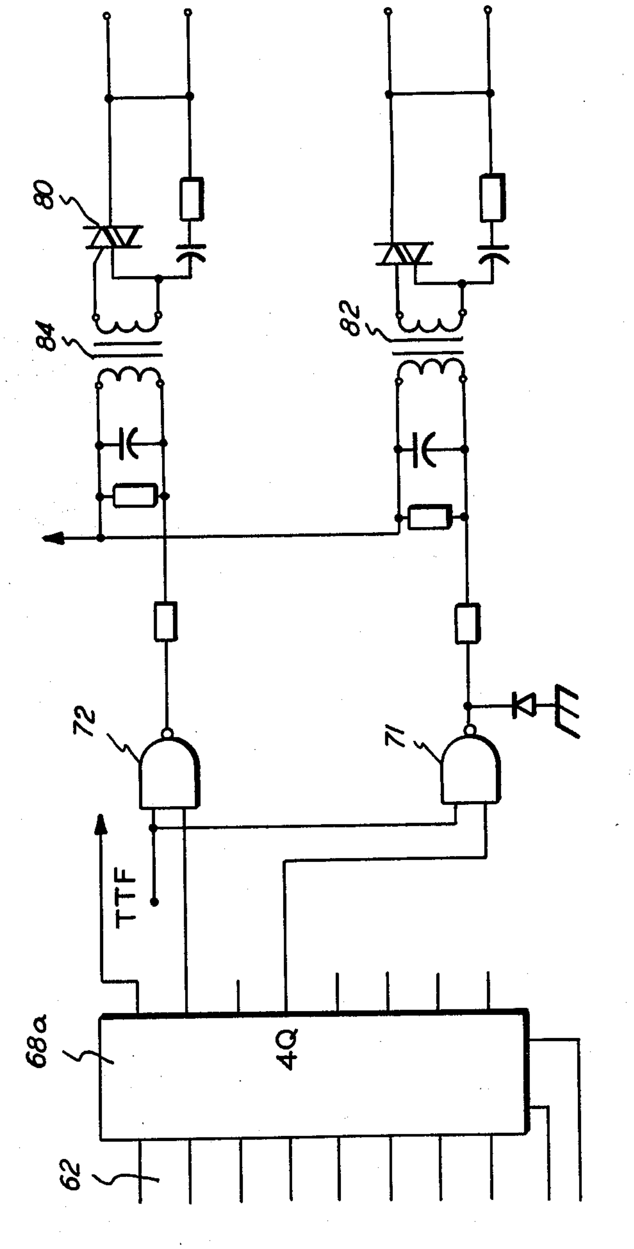

The fuser triac 78 activates the fuser heat lamp 74 providing the heat necessary to fuse the dry toner to the copy sheets 216. Enabling of the fuser traic 78 by the "fuser on" signal provide input line voltage to the fuser heat lamp 74 as illustrated by lines ACH and ACN. The fuser on signal is connected to transformer 82 activated by driver 71 as seen in FIGS. 3 and 4*c*. The upper fuser 112 includes the fuser heat lamp 74 and as illustrated in FIG. 5, heat is conveyed from the heat lamp 74 to the upper fuser 112. The lower fuser or base 114 is maintained at a given temperature level by base heater 104 housed in the lower fuser or base 114 and as illustrated in FIG. 5, heat is conveyed from base heater 104 to base 114.

A prefuser transport 122 attached to the upper fuser 112 supports copy sheets to be driven between upper fuser 112 and base 114. The unfused copy enters the fusing station 224 and toner is fused to the paper and the copy is then exited through feedout rollers 124 to exit tray 225 as seen in FIG. 1. To prevent overheating, the fan 76 with motor 120 exhausts excess heat from the upper fuser 112. Two overheat thermostats (not shown) on the upper fuser 112 connect one line input to the main drive motor of the machine and to the fuser heat lamp 74. If the fuser temperature exceeds approximately 177° C., the thermostats will open and remove line current from the main drive motor of the machine and the fuser lamp 74.

A (not shown) warmup thermostat controls the fuser on signal to the fuser triac 78 during warmup. During warmup the fuser station 224, if the temperature is below 72° C., the normally closed contacts of the warmup thermostat cause the machine control 10 to switch on the fuser triac 78 and inhibit start print. As the fuser station 224 warms up and the temperature reaches 72° C., the contacts of the warmup thermostat will open and provides a fuser warm signal to the machine control 10. The machine control 10 will then switch off the fuser triac 78 and indicate that the machine is in a ready state.

During warmup, the fuser on signal allows the fuser triac 78 to control both the fuser heat lamp 74 and the base heater 104 simultaneously. The base heater 104, as illustrated in FIG. 5, is wired in series with the fuser heat lamp 74 and current will flow from ACH through the fuser heat lamp 74, the base heater 104, and the base heater thermostat 106 to neutral or ACN. Most of the voltage will appear across the base heater 104 because its resistance is ten times greater than that of the fuser heat lamp 74. When the fuser triac 78 is in the on state, however, no current can flow through the base heater 104 because the fuser triac 78 forms a shunt across the base heater 104. Instead current flows through the fuser heat lamp 74 from ACH to ACN.

The upper fuser 112 is the primary source of heat, approximately 90 percent, to fuse the image onto the copy sheet during a copy cycle. The base heater 104 maintains the temperature of the base 114 at about 130° C. at standby. Maintaining this temperature in standby allows the upper fuser 112 to reach the correct fusing temperature much faster before the copy gets to the fuser station 224. The lower fuser or base 114 supplies about 10 percent of the heat required to fuse the sheet as it passes between the upper and lower fuser 112, 114.

The mechanical drive for the feed out rollers 124 comes from the main drive motor through a belt, pulleys and coupling (not shown). When the fused sheet is transported out of the fuser by the feed out rollers 124, the lead edge of the sheet actuates a feed out switch 126 sending a sheet feed out signal to the machine control 10.

Figure 6:
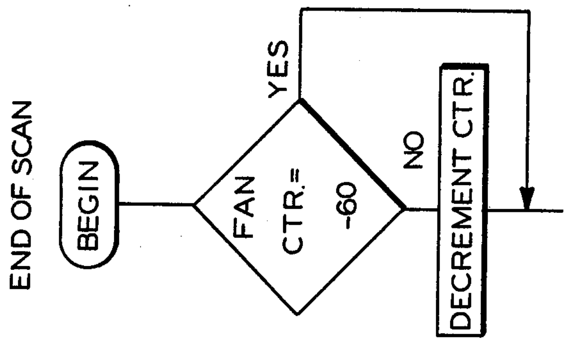
FIG. 6 is a flow chart of the fan counter activation procedure during a reproduction run in accordance with the present invention.

During operation of the copy machine during a normal copy run, the cooling fan is normally on. The amount of time, however, that the cooling fan remains on at the end of a copy run, the cycle out sequence of the machine, will vary depending upon the number of copies reproduced. At the end of a document scan cycle, the scan switch 244 is activated by the end of scan ramp and provides an end of scan signal to the microprocessor 12. During flyback or the return of the carriages 234, 236 to the home position, the fan counter 130 may or may not be decremented in response to the end of scan signal according to the procedure as shown in FIG. 6.

The fan counter 130 is initially set at zero. During the copy run, the fan counter is decremented by one count for each signal from the scan switch at the end of scan position corresponding to each copy reproduced. The sequence continues and the counter is decremented by one for each copy until the count in the fan counter 130 reaches a value of minus 60. At that point, no further change is made to the contents of the fan counter for additional copies produced. The procedure during a copy run is to continually check the contents of the fan counter 130. If the contents manifest the number minus 60, no change is made to the counter. If the contents do not manifest the number minus 60, the contents of the counter are decremented by one for each end of scan signal.

At the end of the copy run, the contents of the fan counter 130 will manifest a value ranging from minus 1 to minus 60. During the cycle out sequence, the cooling fan will remain on three seconds for each count in the fan counter 103 at the completion of a copy run.

Figure 7:
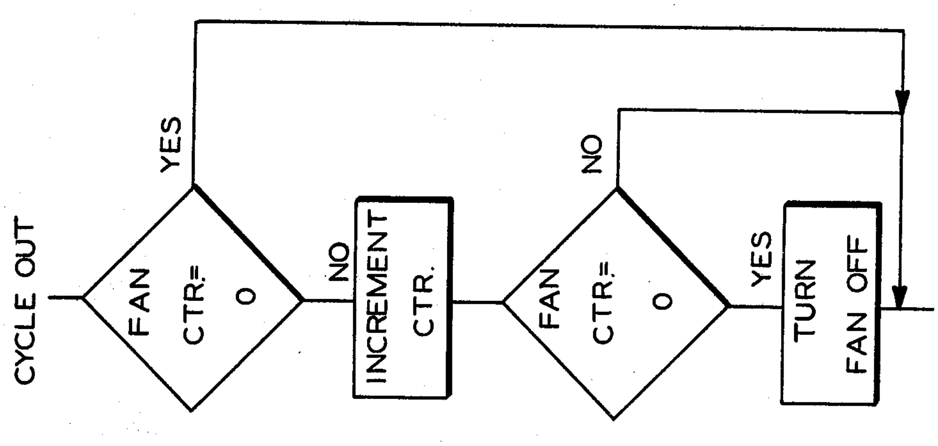
FIG. 7 is a flow chart illustrating cooling fan operation during machine cycle out at the end of a reproduction run.

With reference to the flow chart in FIG. 7, at the beginning of the cycle out procedure, the contents of the fan counter 130 are sensed at the first decision block. If the contents are zero, the fan will have already been turned off. However, if the contents of the fan counter are not zero, for example, −10, the fan counter 130 will be incremented by one, for example, from a −10 to a −9.

After three seconds, the fan counter is again checked for a zero manifestation. If zero, the fan is turned off and the procedure stops. If the fan counter is not zero, the fan remains on an additional three seconds and the procedure is repeated. The procedure is repeated and the fan remains on for periods of three seconds until the fan counter has been incremented to manifest zero content.

The fan control or count in counter 130 is cumulative for successive copy runs. That is, if a second copy run is initiated before the expiration of the previous run-cooling period, the second copy run cooling period will be added to the unexpired portion of the previous run cooling period.

For example, assuming a 10 copy first copy run, there will be required 30 seconds of cooling (10×3 seconds). If a second copy run of 15 copies is initiated after 20 seconds of cooling after the first copy run, the total cooling period required at the end of the second copy run will be 55 seconds. That is, the 45 seconds (15×3 seconds) required for the second copy run will be added to the 10 seconds remaining for the first copy run. Of course, after a maximum 180 seconds, no additional cooling time can be added.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed is:

1. In a reproduction machine for producing copies of documents, the machine having a fuser for fixing images produced on the copies and a cooling system cooperating with the fuser for dissipating heat, a method of controlling the cooling system comprising the steps of, generating a signal manifesting a production cycle, activating a counter in response to the production cycle, monitoring the counter during machine cycle out, and controlling the cooling system depending upon the count contents of the counter.

2. The method of claim 1 wherein the step of monitoring the counter during machine cycle out includes the step of monitoring the counter at fixed time intervals.

3. The method of claim 2 wherein the fixed time interval is a three second interval.

4. A reproduction machine having a cooling means and a cooling means time control, the method of controlling the operation of the cooling means comprising the steps of, activating the cooling means time control in response to the number of copies reproduced in a first copy run, monitoring the contents of the cooling means time control at the end of the copy run, maintaining the operation of the cooling means a given period of time dependent upon the cooling means time control.

5. The method of claim 4 wherein the step of maintaining the operation of the cooling means includes the step of maintaining the operation for successive fixed intervals of time corresponding to the contents of the cooling means time control.

6. The method of claim 5 wherein the contents of the cooling means time control represent counts in a counter and the step of maintaining the operation of the cooling means includes the step of maintaining the operation for a fixed time interval for each count in the counter.

7. The method of claim 4 wherein the step of activating the cooling means time control includes the step of activating the cooling means time control in response to the number of copies reproduced in a second copy run, the cooling means time control activation being cumulative up to a predetermined number.

8. In a reproduction machine having a fuser, a cooling fan communicating with the fuser, and a fan counter maintaining a copy cycle count, the method of controlling the operation of the fan to regulate the cooling comprising the steps of, storing a representation in the counter of the first copy reproduced, storing a representation in the counter of each subsequent copy reproduced up to a predetermined count, maintaining a constant count in the counter upon achieving said predetermined count, at the end of the reproduction run in cycle out, altering the contents of the fan counter toward the original setting of the counter in successive steps corresponding to counts in the counter, maintaining the operation of the cooling fan a predetermined period of time for each of said steps and inhibiting operation of the fan upon manifestation in the fan counter of a count corresponding to the initial count in the counter.

9. A method of regulating heat generation in a reproduction machine having a heat control and a plurality of processing elements cooperating with one another to produce copies comprising the steps of generating a signal indicating a reproduction run, activating a counter in response to the reproduction run, conveying a manifestation in response to the counter to the heat control, and regulating heat generation by the heat control in response to said manifestation.

* * * * *